US011947306B2

(12) United States Patent
Hatano et al.

(10) Patent No.: US 11,947,306 B2
(45) Date of Patent: Apr. 2, 2024

(54) DEVELOPING CARTRIDGE INCLUDING ELECTRICALLY NON-CONDUCTIVE COLLAR COVERING END PORTION OF DEVELOPING-ROLLER SHAFT

(71) Applicant: BROTHER KOGYO KABUSHIKI KAISHA, Nagoya (JP)

(72) Inventors: Shuhei Hatano, Komaki (JP); Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/161,138

(22) Filed: Jan. 30, 2023

(65) Prior Publication Data

US 2023/0244178 A1 Aug. 3, 2023

(30) Foreign Application Priority Data

Jan. 31, 2022 (JP) ................................ 2022-013018

(51) Int. Cl.
*G03G 21/16* (2006.01)
*G03G 21/18* (2006.01)

(52) U.S. Cl.
CPC ..... *G03G 21/1647* (2013.01); *G03G 21/1652* (2013.01); *G03G 21/1676* (2013.01); *G03G 21/1867* (2013.01)

(58) Field of Classification Search
CPC ........... G03G 21/1647; G03G 21/1652; G03G 21/1676; G03G 21/1867
See application file for complete search history.

(56) References Cited

U.S. PATENT DOCUMENTS

2013/0142550 A1 6/2013 Fujioka
2016/0223983 A1 8/2016 Taguchi et al.
2017/0090341 A1 3/2017 Shinoya
(Continued)

FOREIGN PATENT DOCUMENTS

JP 2014-102403 A 6/2014
JP 2015-125361 A 7/2015
JP 2021-117386 A 8/2021

OTHER PUBLICATIONS

International Search Report and Written Opinion issued in corresponding International Patent Application No. PCT/ JP2023/ 002702, dated Mar. 20, 2023.

*Primary Examiner* — Sophia S Chen
(74) *Attorney, Agent, or Firm* — Merchant & Gould P.C.

(57) ABSTRACT

A developing cartridge includes: a housing accommodating developing agent; a developing roller including a developing-roller shaft extending in a first direction; an electrode made of an electrically conductive resin; and a first collar made of an electrically non-conductive resin. The electrode is positioned at one end portion of the housing in the first direction. The electrode is electrically connected to the developing-roller shaft. The first collar covers one end portion of the developing-roller shaft in the first direction. The first collar includes: a first arm extending in the first direction; and a first pawl configured to engage with the electrode. The first pawl protrudes from the first arm in a direction away from the developing-roller shaft. The first pawl is movable between: a first position at which the first pawl is in engagement with the electrode; and a second position at which the first pawl is separated from the electrode.

13 Claims, 10 Drawing Sheets

(56) References Cited

U.S. PATENT DOCUMENTS

| | | | | |
|---|---|---|---|---|
| 2019/0302641 | A1* | 10/2019 | Wang ................. | G03G 21/1652 |
| 2020/0310278 | A1 | 10/2020 | Itabashi | |
| 2020/0310279 | A1 | 10/2020 | Itabashi | |
| 2020/0310291 | A1 | 10/2020 | Itabashi | |
| 2020/0310340 | A1 | 10/2020 | Itabashi | |
| 2020/0310343 | A1 | 10/2020 | Itabashi | |
| 2022/0171323 | A1* | 6/2022 | Hatano .............. | G03G 21/1676 |

* cited by examiner

DEVELOPING CARTRIDGE INCLUDING ELECTRICALLY NON-CONDUCTIVE COLLAR COVERING END PORTION OF DEVELOPING-ROLLER SHAFT

REFERENCE TO RELATED APPLICATIONS

This application claims priority from Japanese Patent Application No. 2022-013018 filed on Jan. 31, 2022. The entire content of the priority application is incorporated herein by reference.

BACKGROUND ART

There have conventionally been known electrophotographic image-forming apparatuses such as laser printers and LED printers. Such image-forming apparatuses use a developing cartridge. The developing cartridge includes a developing roller for supplying a developing agent.

DESCRIPTION

The conventional developing roller includes a developing-roller shaft. The developing-roller shaft is electrically conductive. An end portion of the developing-roller shaft is exposed to an end portion of the developing cartridge. In a case where the image-forming apparatus and the developing cartridge are made more compact, the end portion of the developing-roller shaft is closer to other parts in the image-forming apparatus, which makes it difficult to ensure insulation between the developing-roller shaft and those parts.

There are cases in which a collar is attached to the end portion of the developing-roller shaft. The developing-roller shaft has a groove. The collar includes a pawl. The pawl of the collar engages with the groove of the developing-roller shaft. With this configuration, the collar is attached to the developing-roller shaft. However, in a case where the developing cartridge is made more compact, the length of an arm connecting the main body of the collar and the pawl is shorter, which makes the arm difficult to bend.

It is an object of the present disclosure to provide a developing cartridge having a structure in which insulation of a developing-roller shaft can be easily ensured and an arm of a collar easily bends even in a case where the developing cartridge is made more compact.

In order to attain the above and other objects, the present disclosure provides a developing cartridge including a housing, a developing roller, an electrode, and a first collar. The housing is configured to accommodate a developing agent. The developing roller includes a developing-roller shaft extending in a first direction. The electrode is positioned at one end portion of the housing in the first direction. The electrode is electrically connected to the developing-roller shaft. The electrode is made of an electrically conductive resin. The first collar covers one end portion of the developing-roller shaft in the first direction. The first collar is made of an electrically non-conductive resin. The first collar includes a first arm and a first pawl. The first arm extends in the first direction. The first pawl is configured to engage with the electrode. The first pawl protrudes from the first arm in a direction away from the developing-roller shaft. The first pawl is movable between: a first position at which the first pawl is in engagement with the electrode; and a second position at which the first pawl is separated from the electrode.

In the above configuration, the first collar, which is electrically non-conductive, covers the one end portion of the developing-roller shaft. Accordingly, insulation between the one end portion of the developing-roller shaft and other parts can be easily ensured even in a case where the developing cartridge is made more compact. Also, the first pawl engages not with the developing-roller shaft but with the electrode positioned outside the developing-roller shaft. Hence, the length of the first arm can be made longer while suppressing an increase in the length of the developing-roller shaft in the first direction, which can make the first arm easily bent.

Hereinafter, an embodiment of the present disclosure will be described while referring to the accompanying drawings.

In the following description, the direction in which a developing-roller shaft 32 extends will be referred to as the "first direction". Further, the direction in which one end portion of a casing 10 at which a developing roller 30 is positioned and another end portion of the casing 10 are aligned will be referred to as the "second direction". The first direction and the second direction cross each other. Preferably, the first direction and the second direction are orthogonal to each other.

<1. Structure of Developing Cartridge>

Figure 1:
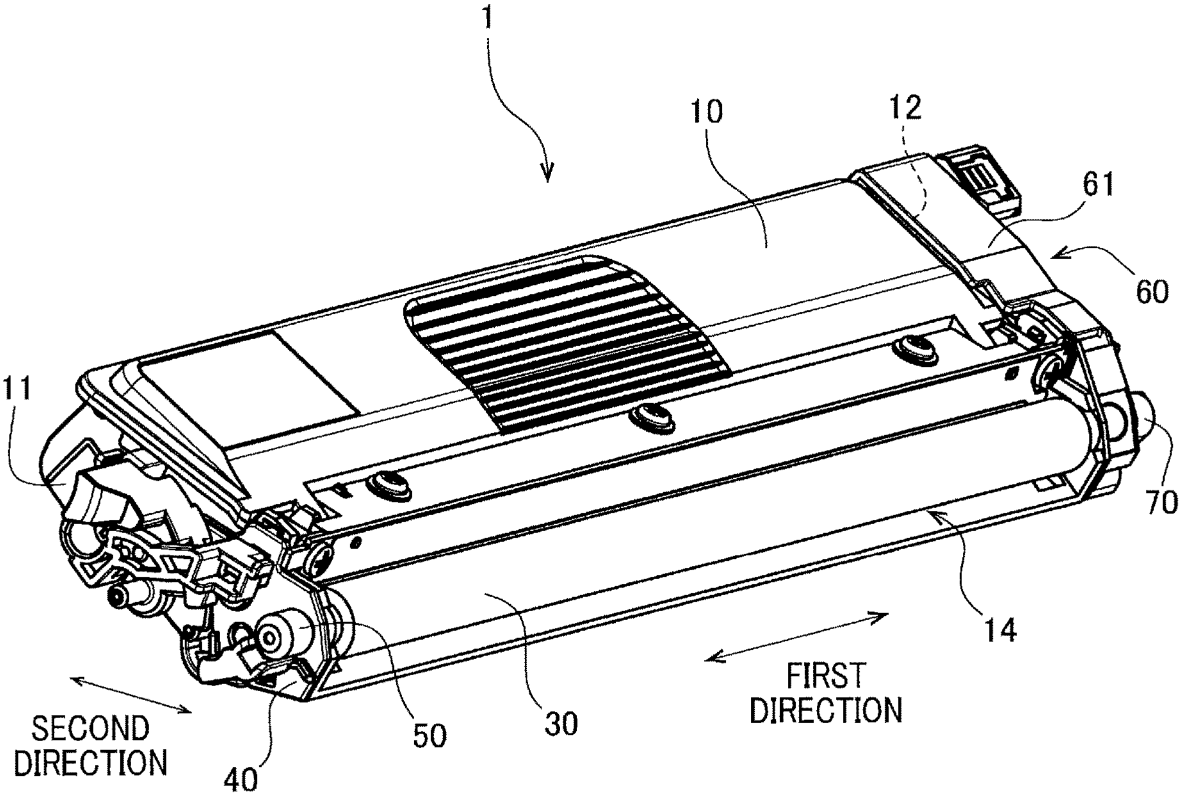
FIG. 1 is a perspective view of a developing cartridge.
Figure 2:
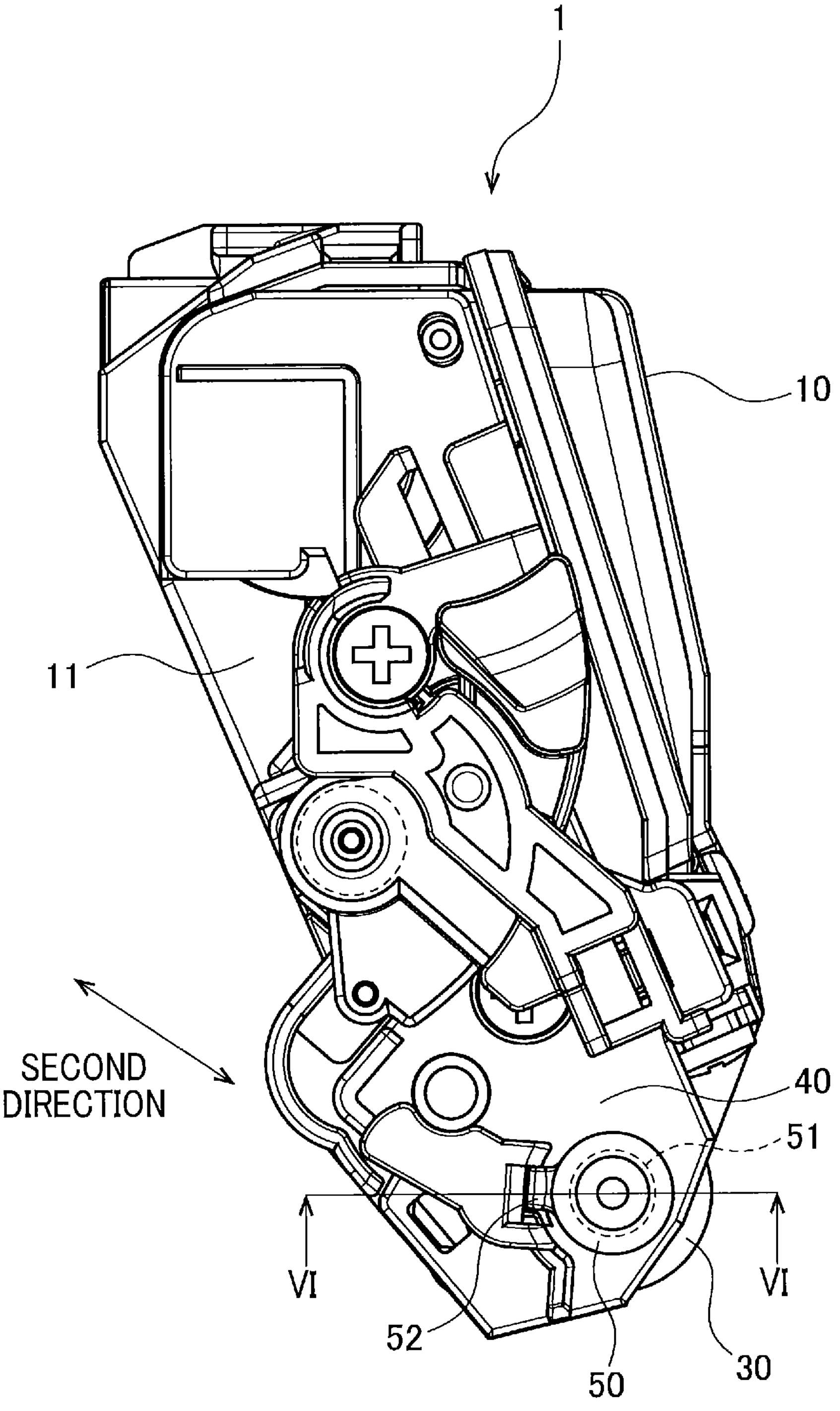
FIG. 2 is a view of the developing cartridge from a first outer surface side.
Figure 3:
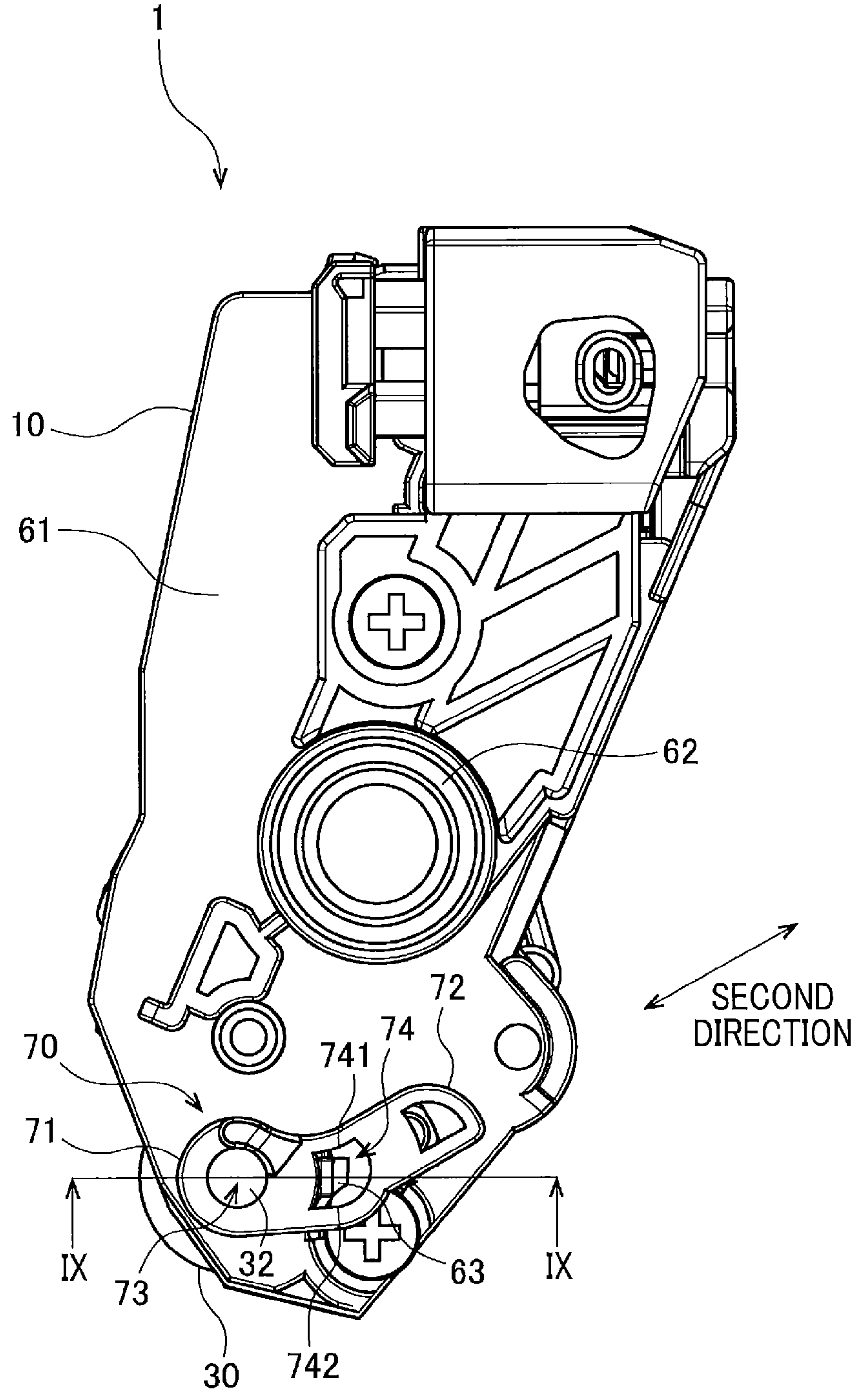
FIG. 3 is a view of the developing cartridge from a second outer surface side.
Figure 4:
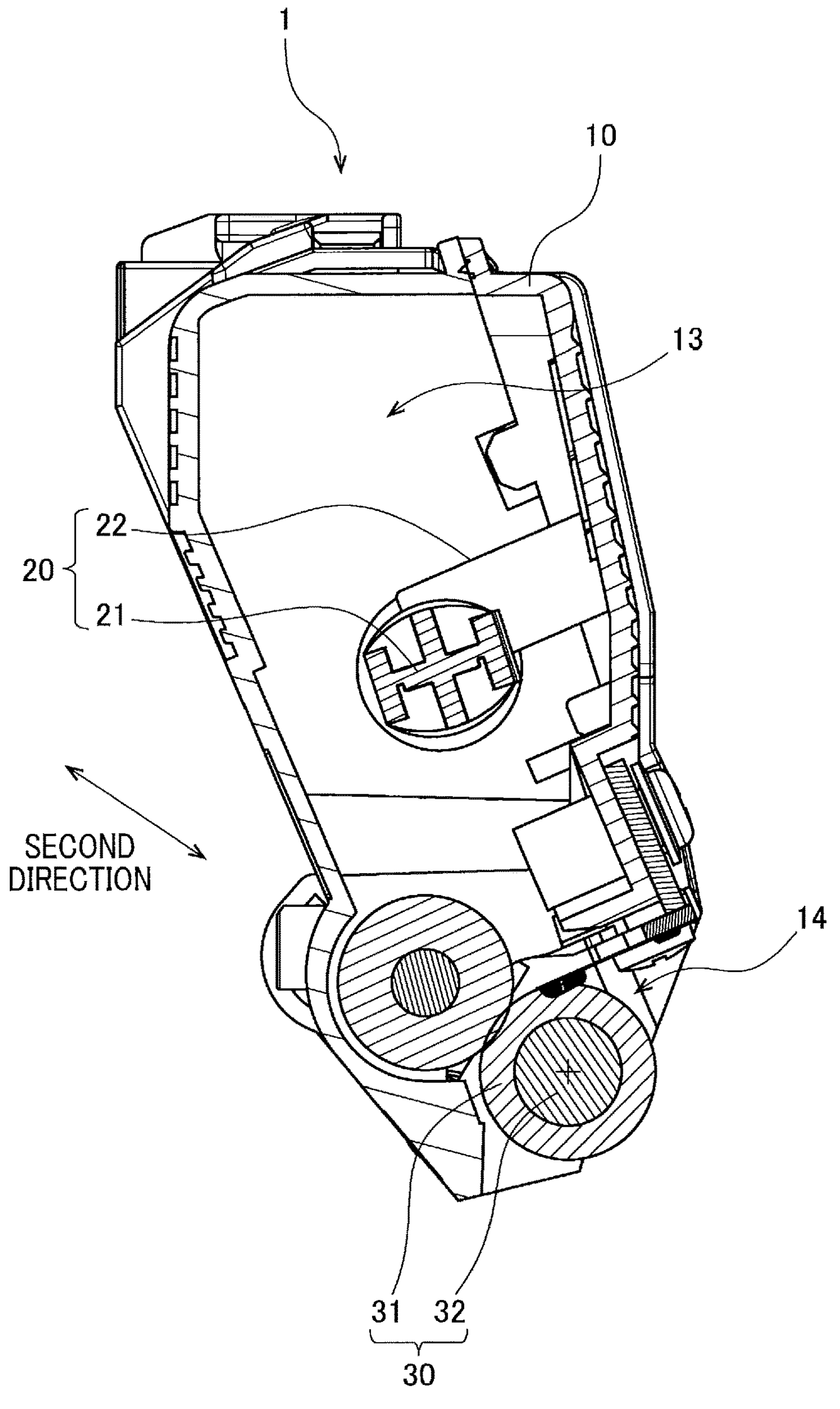
FIG. 4 is a cross-sectional view of the developing cartridge.

FIG. 1 is a perspective view of a developing cartridge 1. FIG. 2 is a view of the developing cartridge 1 from a first outer surface 11 (described later) side. FIG. 3 is a view of the developing cartridge 1 from a second outer surface 12 (described later) side. FIG. 4 is a cross-sectional view of the developing cartridge 1. FIG. 4 illustrates a cross section orthogonal to the first direction.

The developing cartridge 1 is used with an electrophotographic image-forming apparatus. For example, the image-forming apparatus is a laser printer or an LED printer. The developing cartridge 1 is attachable to a drum cartridge including a photosensitive drum. The developing cartridge 1 is attached to the image-forming apparatus in a state where the developing cartridge 1 is attached to the drum cartridge.

For example, four developing cartridges 1 are attachable to the image-forming apparatus. The four developing cartridges 1 accommodate developing agents (for example, toner.) in mutually different colors (for example, the colors cyan, magenta, yellow, and black). The image-forming apparatus forms an image on a printing sheet using the developing agents supplied from the developing cartridges 1. However, the number of the developing cartridges 1 attachable to the image-forming apparatus may be one, two, and three, or five or more.

As illustrated in FIGS. 1 to 4, the developing cartridge 1 includes the casing 10, an agitator 20, the developing roller 30, an electrode 40, a first collar 50, a gear portion 60, and a second collar 70.

The casing 10 is a housing that can accommodate therein a developing agent. The casing 10 has the first outer surface 11 and the second outer surface 12. The first outer surface 11 is positioned at one end portion of the casing 10 in the first direction. The second outer surface 12 is positioned at another end portion of the casing 10 in the first direction. The first outer surface 11 and the second outer surface 12 are separated from each other in the first direction.

The casing 10 includes an accommodation chamber 13. The accommodation chamber 13 is positioned inside the casing 10. The developing agent is accommodated in the accommodation chamber 13. Also, the casing 10 has an opening 14. The opening 14 is positioned at the one end portion of the casing 10 in the second direction. The external space of the casing 10 and the accommodation chamber 13 are communicated with each other through the opening 14. Note that the casing 10 may include a handle on an outer surface at the another end portion of the casing 10 in the second direction.

The agitator 20 includes an agitator shaft 21 and a film 22. The agitator shaft 21 extends along the first direction. The film 22 expands from the agitator shaft 21 toward the inner surface of the casing 10. In other words, the film 22 expands from the agitator shaft 21 radially outward. A portion of the agitator shaft 21 and the film 22 are positioned in the accommodation chamber 13 of the casing 10.

An end portion of the agitator shaft 21 in the first direction is fixed to an agitator gear included in the gear portion 60. When the agitator gear rotates, the agitator shaft 21 and the film 22 rotate about an agitator axis extending in the first direction. This rotation of the film 22 agitates the developing agent in the accommodation chamber 13.

The developing roller 30 is a roller that is rotatable about a developing-roller axis extending in the first direction. The developing roller 30 is positioned at the opening 14 of the casing 10. That is, the developing roller 30 is positioned at the one end portion of the casing 10 in the second direction.

The developing roller 30 includes a developing-roller body 31 and the developing-roller shaft 32. The developing-roller body 31 is a cylindrical member that extends in the first direction. An elastic rubber is used as the material of the developing-roller body 31, for example. The developing-roller shaft 32 is a columnar member that penetrates the developing-roller body 31 to extend in the first direction. The developing-roller body 31 is fixed to the developing-roller shaft 32. The developing-roller shaft 32 is electrically conductive. The developing-roller shaft 32 is made of metal or an electrically conductive resin.

Note that the developing-roller shaft 32 need not necessarily penetrate the developing-roller body 31 in the first direction. For example, the developing-roller shaft 32 may extend in the first direction from each end of the developing-roller body 31 in the first direction.

The electrode 40 is positioned at the first outer surface 11 of the casing 10. Specifically, the electrode 40 is fixed to the first outer surface 11 of the casing 10. The electrode 40 is electrically conductive. Specifically, the electrode 40 is made of an electrically conductive resin.

Figure 6:
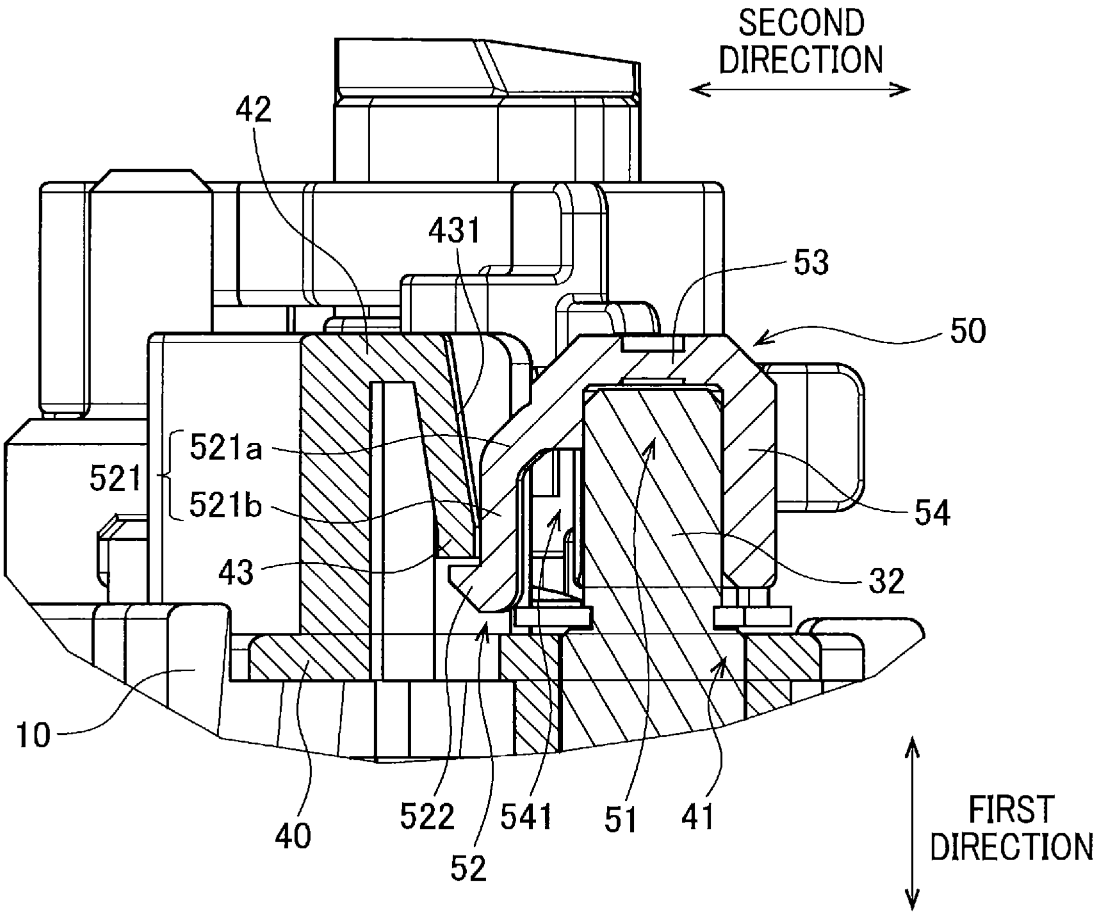
FIG. 6 is a cross-sectional view of the periphery of the first collar taken along line VI-VI in FIG. 2.

The electrode 40 has a shaft-receiving hole 41 (see FIG. 6). The shaft-receiving hole 41 penetrates the electrode 40 in the first direction. One end portion of the developing-roller shaft 32 in the first direction is inserted in the shaft-receiving hole 41. With this configuration, the developing-roller shaft 32 is supported so as to be rotatable relative to the electrode 40. Also, the one end portion of the developing-roller shaft 32 in the first direction is in contact with the electrode 40. Hence, the electrode 40 is electrically connected to the developing-roller shaft 32.

When a drum cartridge having the developing cartridge 1 attached thereto is attached to the image-forming apparatus, the image-forming apparatus supplies a bias voltage to the developing-roller shaft 32 via the electrode 40. The electrostatic force between the developing-roller shaft 32 and the developing agent causes the developing agent to be carried on the outer circumferential surface of the developing-roller body 31.

The first collar 50 is positioned at the first outer surface 11 of the casing 10. The first collar 50 is electrically non-conductive. Specifically, the first collar 50 is made of an electrically non-conductive resin. The first collar 50 has a cap shape. That is, the first collar 50 has a first hole 51. The first hole 51 is a recessed portion that is recessed in the first direction. The first hole 51 has a cylindrical inner circumferential surface. That is, the first collar 50 has the cylindrical inner circumferential surface defining the first hole 51. The one end portion of the developing-roller shaft 32 in the first direction is inserted in the first hole 51. With this configuration, the first collar 50 is attached to the one end portion of the developing-roller shaft 32 in the first direction. Also, the first collar 50 covers the one end portion of the developing-roller shaft 32 in the first direction.

The first collar 50 includes a first engagement portion 52. The first engagement portion 52 is in engagement with the electrode 40. Hence, the first collar 50 is suppressed from coming off the developing-roller shaft 32 in a direction away from the casing 10 in the first direction.

Note that a specific structure of the first collar 50 will be described later.

The gear portion 60 is positioned at the second outer surface 12 of the casing 10. The gear portion 60 includes a gear cover 61, a coupling 62, and a plurality of gears. The gear cover 61 constitutes the housing of the developing cartridge 1 in cooperation with the casing 10. The gear cover 61 is fixed to the second outer surface 12 of the casing 10. The plurality of gears includes the agitator gear fixed to the agitator shaft 21, and a developing-roller gear fixed to the developing-roller shaft 32. At least a part of the plurality of gears is positioned between the second outer surface 12 and the gear cover 61.

The coupling 62 is exposed from the gear cover 61. When the developing cartridge 1 attached to the drum cartridge is attached to the image-forming apparatus, a driving shaft of the image-forming apparatus connects to the coupling 62. Rotation of the driving shaft is transmitted to both the agitator gear and the developing-roller gear through the coupling 62. Note that the plurality of gears of the gear portion 60 may be gears configured to transmit a rotation force by meshing engagements of teeth or gears configured to transmit a rotation force by friction between the gears.

The second collar 70 is positioned at the second outer surface 12 of the casing 10. More specifically, the second collar 70 is positioned at an outer surface of the gear cover 61. That is, the gear cover 61 is positioned between the casing 10 and the second collar 70 in the first direction. The second collar 70 is electrically non-conductive. Specifically, the second collar 70 is made of an electrically non-conductive resin.

As illustrated in FIG. 3, the second collar 70 has a first end portion 71 and a second end portion 72. The second end portion 72 is farther from the developing-roller shaft 32 than the first end portion 71 is from the developing-roller shaft 32. Also, in the second direction, the second end portion 72 is farther from the one end portion in the second direction of the casing 10 than the first end portion 71 is from the one end portion in the second direction of the casing 10. The second collar 70 extends between the first end portion 71 and the second end portion 72 along the second outer surface 12 of the casing 10.

The second collar 70 has a second hole 73. The second hole 73 penetrates the second collar 70 in the first direction. However, the second hole 73 may be a recessed portion that is recessed in the first direction. The second hole 73 has a cylindrical inner circumferential surface. That is, the second collar 70 has the cylindrical inner circumferential surface defining the second hole 73. Another end portion of the developing-roller shaft 32 in the first direction is inserted in the second hole 73. With this configuration, the second collar 70 is attached to the another end portion of the developing-roller shaft 32 in the first direction. Also, the second collar 70 covers the another end portion of the developing-roller shaft 32 in the first direction. The second collar 70 is pivotally movable relative to the casing 10 about the developing-roller shaft 32. Specifically, the second end portion 72 of the second collar 70 is pivotally movable relative to the first end portion 71 about the developing-roller shaft 32.

The gear cover 61 includes a second engagement portion 63. The second engagement portion 63 protrudes from an outer surface of the gear cover 61 toward the second collar 70 in the first direction. The second engagement portion 63 is in engagement with the second collar 70. Hence, the second collar 70 is suppressed from coming off the developing-roller shaft 32 in a direction away from the casing 10 in the first direction.

The second collar 70 has a through-hole 74. The through-hole 74 penetrates the second collar 70 in the first direction. The through-hole 74 has a first stopper surface 741 and a second stopper surface 742. That is, the second collar 70 has an inner surface defining the through-hole 74, and this inner surface includes the first stopper surface 741 and the second stopper surface 742. Hereinafter, this inner surface will be sometimes called the "inner surface of the through-hole 74". The first stopper surface 741 and the second stopper surface 742 are separated from each other in a pivoting direction in which the second end portion 72 pivotally moves about the developing-roller shaft 32. The second engagement portion 63 described above is inserted in the through-hole 74.

The second collar 70 is pivotally movable about the developing-roller shaft 32 between a first pivotal position and a second pivotal position. When the second collar 70 is positioned at the first pivotal position, the second engagement portion 63 is in contact with the first stopper surface 741. On the other hand, when the second collar 70 is positioned at the second pivotal position, the second engagement portion 63 is in contact with the second stopper surface 742. Hence, the pivoting range of the second collar 70 is restricted.

The developing cartridge 1 can perform a separation operation by a driving force supplied from the image-forming apparatus after the developing cartridge 1 is attached to the image-forming apparatus with the developing cartridge 1 attached to the drum cartridge. The separation operation is an operation to temporarily separate the developing roller 30 from the photosensitive drum. For performing the separation operation, the image-forming apparatus pushes a cam provided in the drum cartridge. This causes the cam to rotate and come into contact with the second collar 70. Then, the cam pushes the second collar 70 in the second direction and in a direction away from the photosensitive drum. As a result, the casing 10 and the developing roller 30 move from a pressure contact position at which the developing roller 30 is in contact with the photosensitive drum to a separation position at which the developing roller 30 is separated from the photosensitive drum.

Note that a specific structure of the second collar 70 will be described later.

<2. Structure of Periphery of First Collar>

Figure 5:
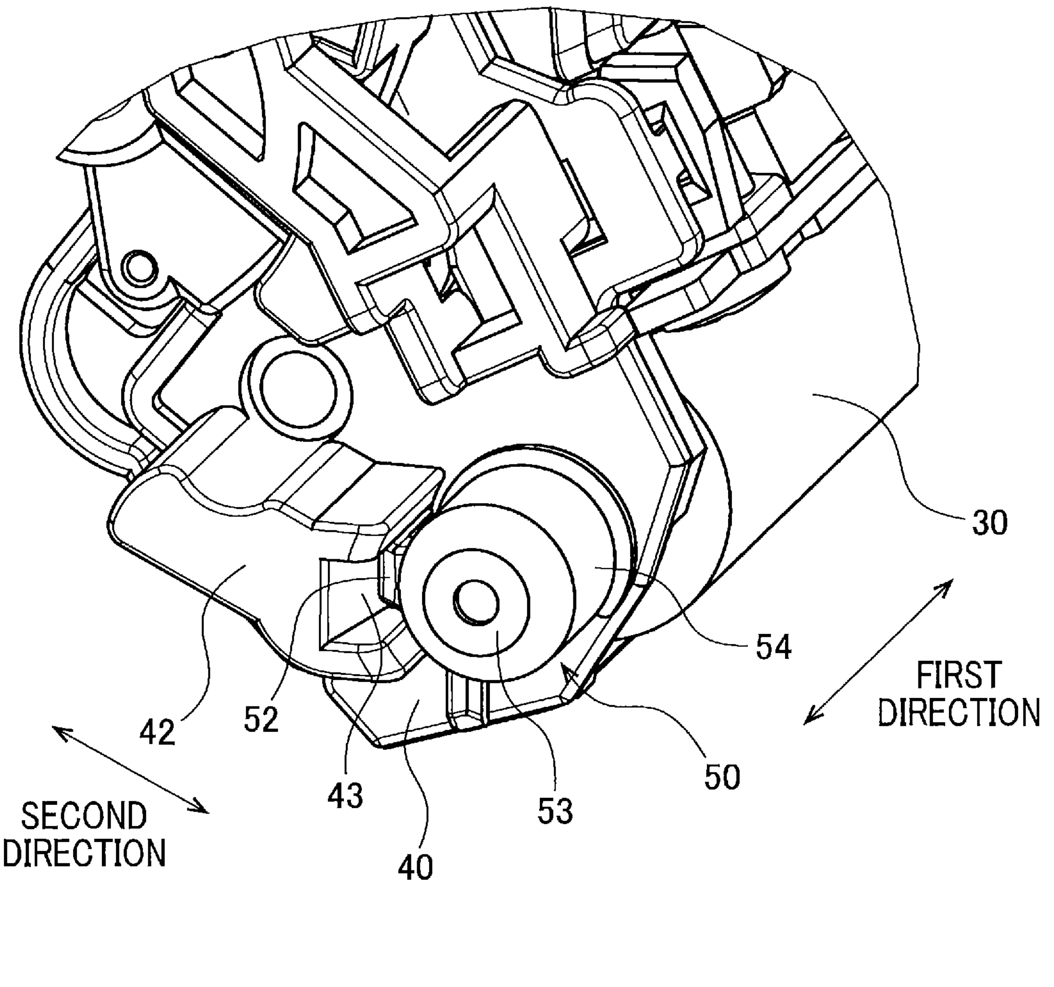
FIG. 5 is a perspective view of the periphery of a first collar.

Next, a more detailed structure of the periphery of the first collar 50 will be described. FIG. 5 is a perspective view of the periphery of the first collar 50. FIG. 6 is a cross-sectional view of the periphery of the first collar 50. Note that FIG. 6 is a cross-sectional view taken along line VI-VI in the FIG. 2.

As illustrated in FIGS. 5 and 6, the first collar 50 includes an end wall portion 53, a circumferential wall portion 54, and the first engagement portion 52. The end wall portion 53 has a disk shape. The end wall portion 53 covers an end surface of the one end portion of the developing-roller shaft 32 in the first direction. The circumferential wall portion 54 extends from the outer circumferential portion of the end wall portion 53 toward the casing 10 in the first direction. The circumferential wall portion 54 has a cylindrical shape centered on the developing-roller shaft 32. The circumferential wall portion 54 covers the outer circumferential surface of the one end portion of the developing-roller shaft 32 in the first direction. The internal space of the circumferential wall portion 54 serves as the first hole 51 described above.

As described above, the one end portion of the developing-roller shaft 32 in the first direction is covered by the first collar 50 that is electrically non-conductive. Hence, the one end portion of the developing-roller shaft 32 in the first direction is not exposed. Accordingly, insulation between the one end portion of the developing-roller shaft 32 that is electrically conductive and other parts in the image-forming apparatus can be easily ensured even in a case where the developing cartridge 1 is made more compact.

The circumferential wall portion 54 has a notch 541. The notch 541 is formed in a part of the circumferential wall portion 54 centered on the developing-roller shaft 32. The first engagement portion 52 is positioned outward of the notch 541 in the radial direction of the developing roller 30. That is, the first engagement portion 52 is positioned on the opposite side of the notch 541 from the developing-roller shaft 32 in the second direction.

The first engagement portion 52 includes a first arm 521 and a first pawl 522. The first arm 521 extends from an edge of the end wall portion 53 toward the casing 10 in the first direction. More specifically, the first arm 521 includes a first portion 521*a* and a second portion 521*b*. The first portion 521*a* extends in the first direction so as to be farther from the developing-roller shaft 32 in the second direction as extending in the first direction. That is, the first portion 521*a* extends in the first direction from an edge of the end wall portion 53 so as to expand further outwardly in the radial direction of the developing roller 30 as extending in the first direction. The second portion 521*b* linearly extends in the first direction from the distal end of the first portion 521*a*.

The first pawl 522 protrudes in the second direction from the distal end of the first arm 521. Specifically, in the second direction, the first pawl 522 protrudes in a direction away from the developing-roller shaft 32. That is, in the second direction, the first pawl 522 protrudes in a direction away from the one end portion in the second direction of the casing 10. Also, in the radial direction of the developing roller 30, the first pawl 522 protrudes in a direction away from the developing-roller shaft 32.

The electrode 40 includes a protruding portion 42 and a first pawl-receiving portion 43. The protruding portion 42 protrudes in the first direction from one end surface of the electrode 40 in the first direction. The first pawl-receiving portion 43 protrudes from the protruding portion 42 toward the first collar 50 in the second direction. The first pawl-receiving portion 43 faces the first arm 521 in the second direction. There is a gap between the first pawl-receiving portion 43 and the casing 10 in the first direction.

The first pawl 522 can engage with the first pawl-receiving portion 43 of the electrode 40. Specifically, the first pawl 522 is inserted in the gap between the first pawl-receiving portion 43 and the casing 10. One end surface of the first pawl 522 in the first direction is in contact with the first pawl-receiving portion 43. Hence, the first collar 50 is suppressed from coming off the developing-roller shaft 32 in a direction away from the casing 10 in the first direction.

As described above, the first pawl 522 is in engagement with not the developing-roller shaft 32 but the electrode 40 positioned outside the developing-roller shaft 32. With this structure, a groove serving as a pawl-receiving portion does not need to be provided in the developing-roller shaft 32. Hence, the length of the developing-roller shaft 32 in the first direction can be suppressed from increasing. Also, the length of the first arm 521 can be made longer than when a configuration is employed in which the first pawl 522 engages with the developing-roller shaft 32. Accordingly, in releasing the engagement of the first pawl 522 with the first pawl-receiving portion 43, the first arm 521 can be bent well.

In a case where the developing cartridge 1 is recycled, the first collar 50 is detached from the developing-roller shaft 32. Next, an operation to detach the first collar 50 from the developing-roller shaft 32 will be described.

Figure 7:
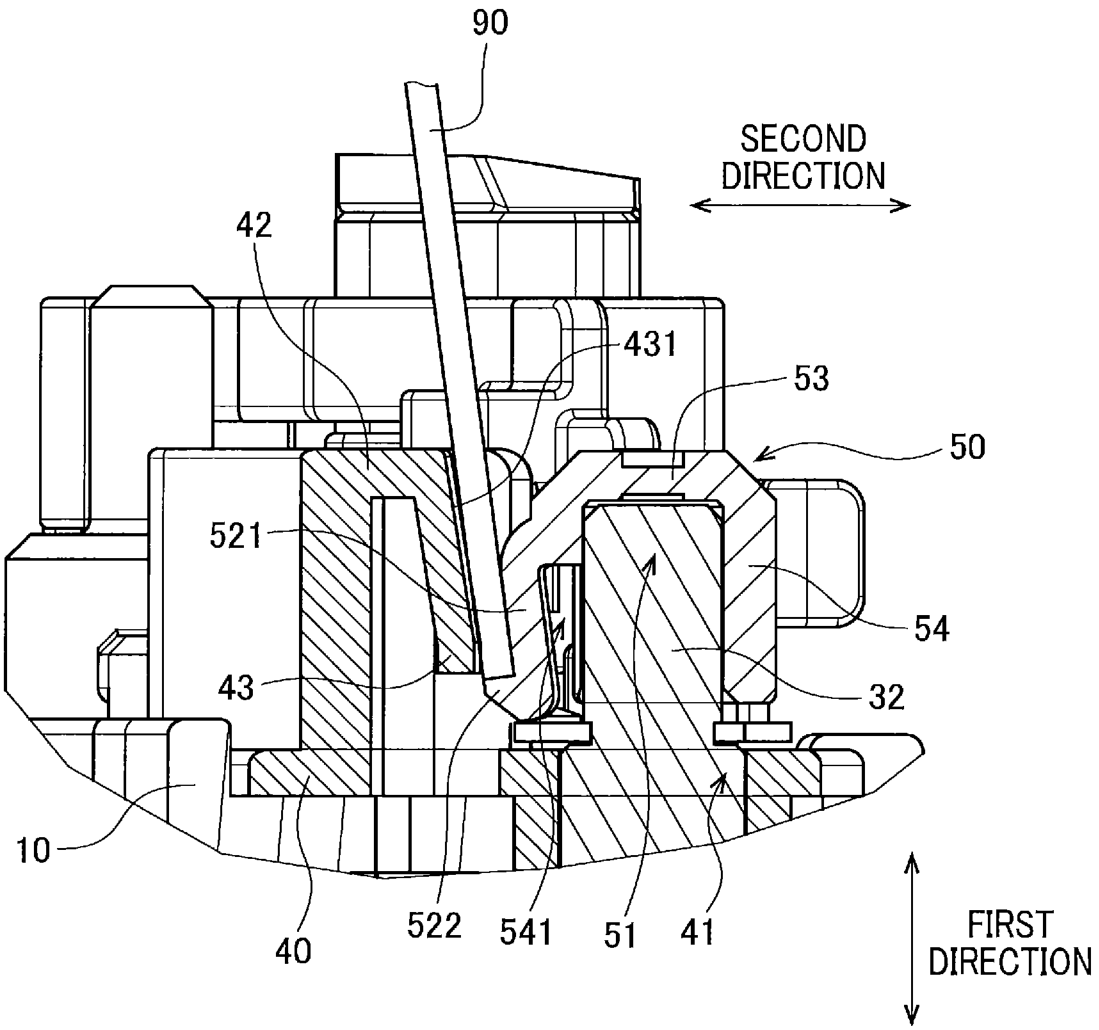
FIG. 7 is a cross-sectional view of the periphery of the first collar in a state where a jig is inserted.

For detaching the first collar 50 from the developing-roller shaft 32, a jig 90 is first inserted between the first pawl-receiving portion 43 and the first arm 521. FIG. 7 is a cross-sectional view of the periphery of the first collar 50 in a state where the jig 90 is inserted. When the jig 90 is inserted between the first pawl-receiving portion 43 and the first arm 521, the first arm 521 bends and the first pawl 522 thus moves from a first position (the position illustrated in FIG. 6) at which the first pawl 522 is in engagement with the first pawl-receiving portion 43 to a second position (the position illustrated in FIG. 7) at which the first pawl 522 is separated from the first pawl-receiving portion 43. Hence, the engagement of the first pawl 522 with the first pawl-receiving portion 43 is released.

Thereafter, the first collar 50 moves in a direction away from the casing 10 in the first direction with the first pawl 522 positioned at the second position. As a result, the first collar 50 is detached from the one end portion of the developing-roller shaft 32 in the first direction.

The first pawl-receiving portion 43 has a first tapered surface 431. The first tapered surface 431 faces the first arm 521 in the second direction. The first tapered surface 431 is inclined relative to the first direction. More specifically, the first tapered surface 431 is closer to the first arm 521 in the second direction as approaching the first pawl 522 in the first direction. With this structure, simply by inserting the jig 90 between the first tapered surface 431 and the first arm 521 and further pushing the inserted jig 90 along the first tapered surface 431, the first arm 521 can be bent and the first pawl 522 can thus be moved from the first position to the second position, whereby the first pawl 522 can be easily disengaged from the electrode 40.

The first arm 521 and the first pawl 522 are provided not at the electrode 40 made of an electrically conductive resin but at the first collar 50 made of an electrically non-conductive resin. Electrically non-conductive resins have a higher flexibility than electrically conductive resins. Hence, by having the first collar 50 provided with the first arm 521 and the first pawl 522, the first arm 521 can be bent well. Accordingly, the first arm 521 can be suppressed from being broken during detachment of the first collar 50 from the developing-roller shaft 32.

Also, in the structure of the present embodiment, the first collar 50 has the notch 541. The first arm 521 and the first pawl 522 are positioned on the opposite side of the notch 541 from the developing-roller shaft 32 in the second direction. With this structure, the positions of the first arm 521 and the first pawl 522 can be closer to the developing-roller shaft 32 than when a configuration is employed in which the first collar 50 does not have the notch 541. Therefore, the first collar 50 can be made more compact.

If the first pawl 522 moves to a position that is closer to the developing-roller shaft 32 than the second position is to the developing-roller shaft 32, the first arm 521 comes into contact with the developing-roller shaft 32. Hence, the first arm 521 can be suppressed from being excessively bent. That is, the outer circumferential surface of the developing-roller shaft 32 serves as a restriction surface for restricting bending of the first arm 521. Accordingly, the first arm 521 can be further suppressed from being broken.

<3. Structure of Periphery of Second Collar>

Figure 8:
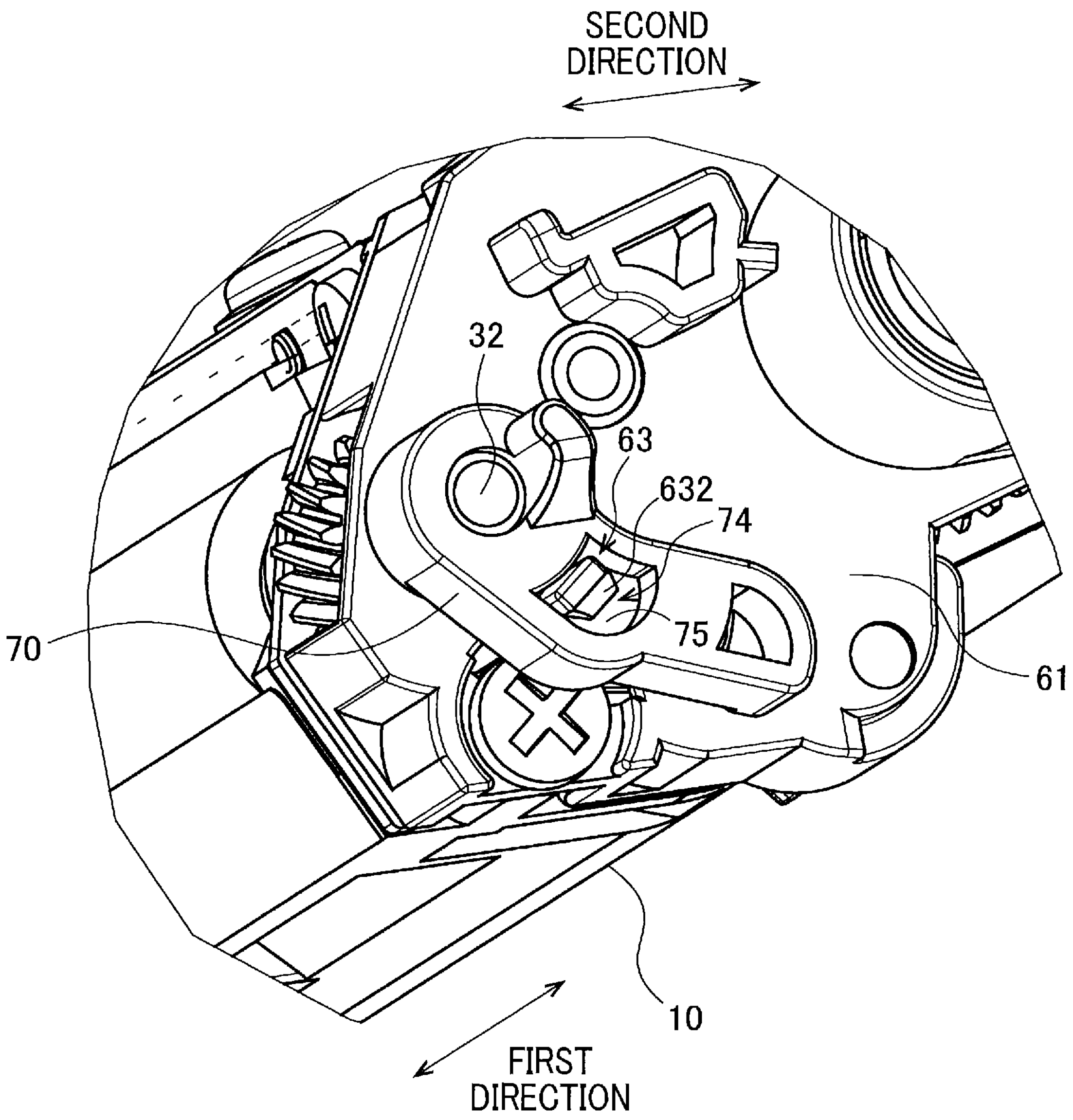
FIG. 8 is a perspective view of the periphery of a second collar.
Figure 9:
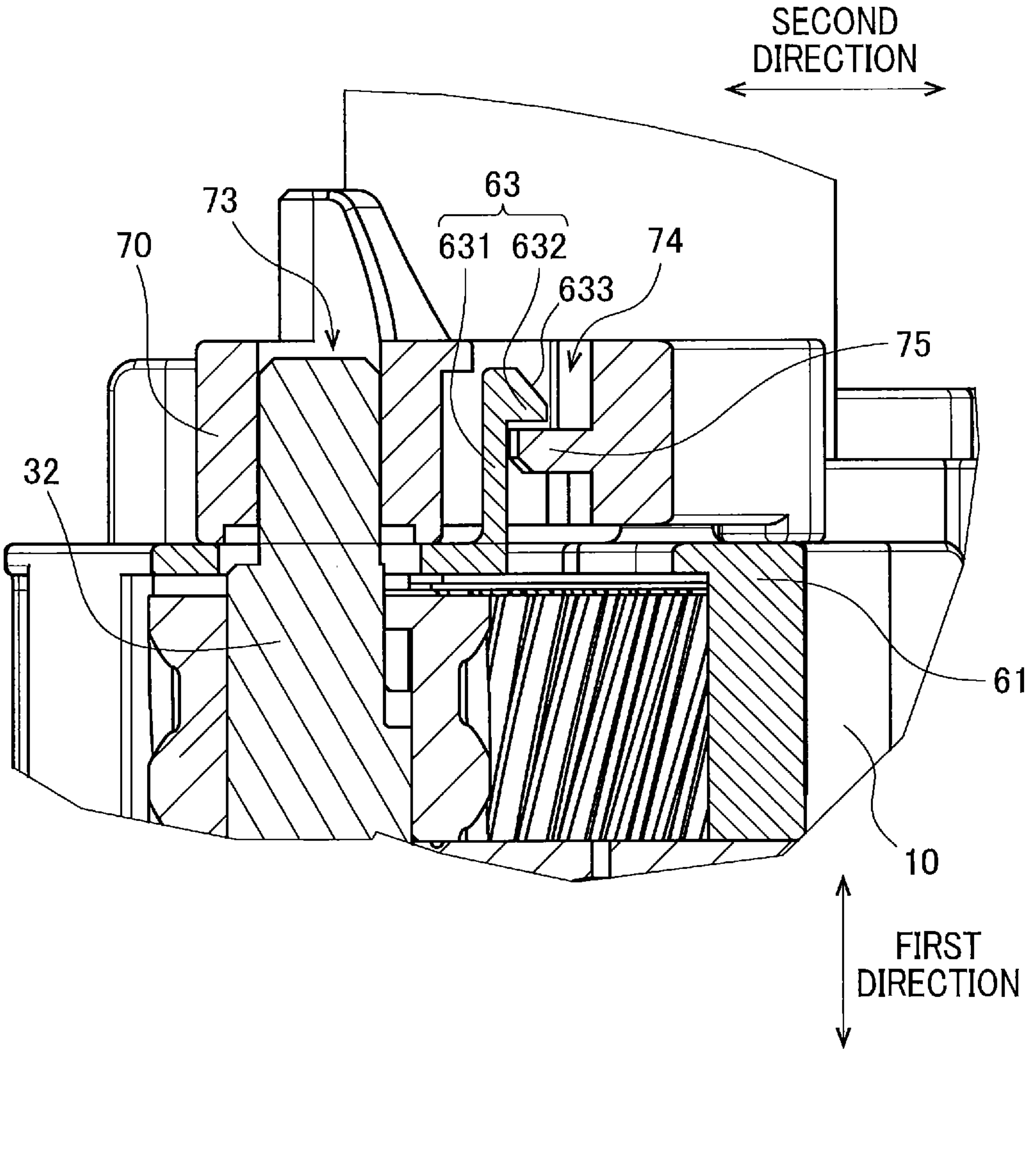
FIG. 9 is a cross-sectional view of the periphery of the second collar taken along line IX-IX in FIG. 3.

Next, a more specific structure of the periphery of the second collar 70 will be described. FIG. 8 is a perspective view of the periphery of the second collar 70. FIG. 9 is a cross-sectional view of the periphery of the second collar 70. Note that FIG. 9 is a cross-sectional view taken along line IX-IX in FIG. 3.

As described above, the second collar 70 has the through-hole 74. The through-hole 74 penetrates the second collar 70 in the first direction. Also, the gear cover 61 includes the second engagement portion 63. The second engagement portion 63 is inserted in the through-hole 74.

The second engagement portion 63 includes a second arm 631 and a second pawl 632. The second arm 631 extends from an outer surface of the gear cover 61 toward the second collar 70 in the first direction. That is, the second arm 631 extends in a direction away from the casing 10 in the first direction. The second pawl 632 protrudes in the second direction from the distal end of the second arm 631. More specifically, in the second direction, the second pawl 632 protrudes in a direction away from the developing-roller shaft 32. That is, in the second direction, the second pawl 632 protrudes in a direction away from the one end portion in the second direction of the casing 10. Also, in the radial direction of the developing roller 30, the second pawl 632 protrudes in a direction away from the developing-roller shaft 32.

The second collar 70 includes a second pawl-receiving portion 75. The second pawl-receiving portion 75 is positioned in the through-hole 74. More specifically, the second pawl-receiving portion 75 protrudes from the inner surface of the through-hole 74 toward the inward side of the through-hole 74. Also, the second pawl-receiving portion 75 protrudes from the inner surface of the through-hole 74 toward the second arm 631. Moreover, the second pawl-receiving portion 75 protrudes toward the developing-roller shaft 32 in the second direction. The second pawl-receiving portion 75 faces the second arm 631 in the second direction.

The second pawl 632 can engage with the second pawl-receiving portion 75 of the second collar 70. Specifically, the second pawl-receiving portion 75 is inserted between the casing 10 and the second pawl 632. One end surface of the second pawl 632 in the first direction is in contact with the second pawl-receiving portion 75. Hence, the second collar 70 is suppressed from coming off the developing-roller shaft 32 in a direction away from the casing 10 in the first direction.

As described above, the second collar 70 is in engagement with not the developing-roller shaft 32 but the second pawl 632 extending from the gear cover 61 outside the developing-roller shaft 32. With this structure, a groove for engagement does not need to be provided at the developing-roller shaft 32. Hence, the length of the developing-roller shaft 32 in the first direction can be suppressed from increasing. Also, the length of the second arm 631 can be made longer than when a configuration is employed in which the second collar 70 engages with the developing-roller shaft 32. Accordingly, in releasing the engagement of the second pawl 632 with the second pawl-receiving portion 75, the second arm 631 can be bent well.

In a case where the developing cartridge 1 is recycled, the second collar 70 is detached from the developing-roller shaft 32. Next, an operation to detach the second collar 70 from the developing-roller shaft 32 will be described.

Figure 10:
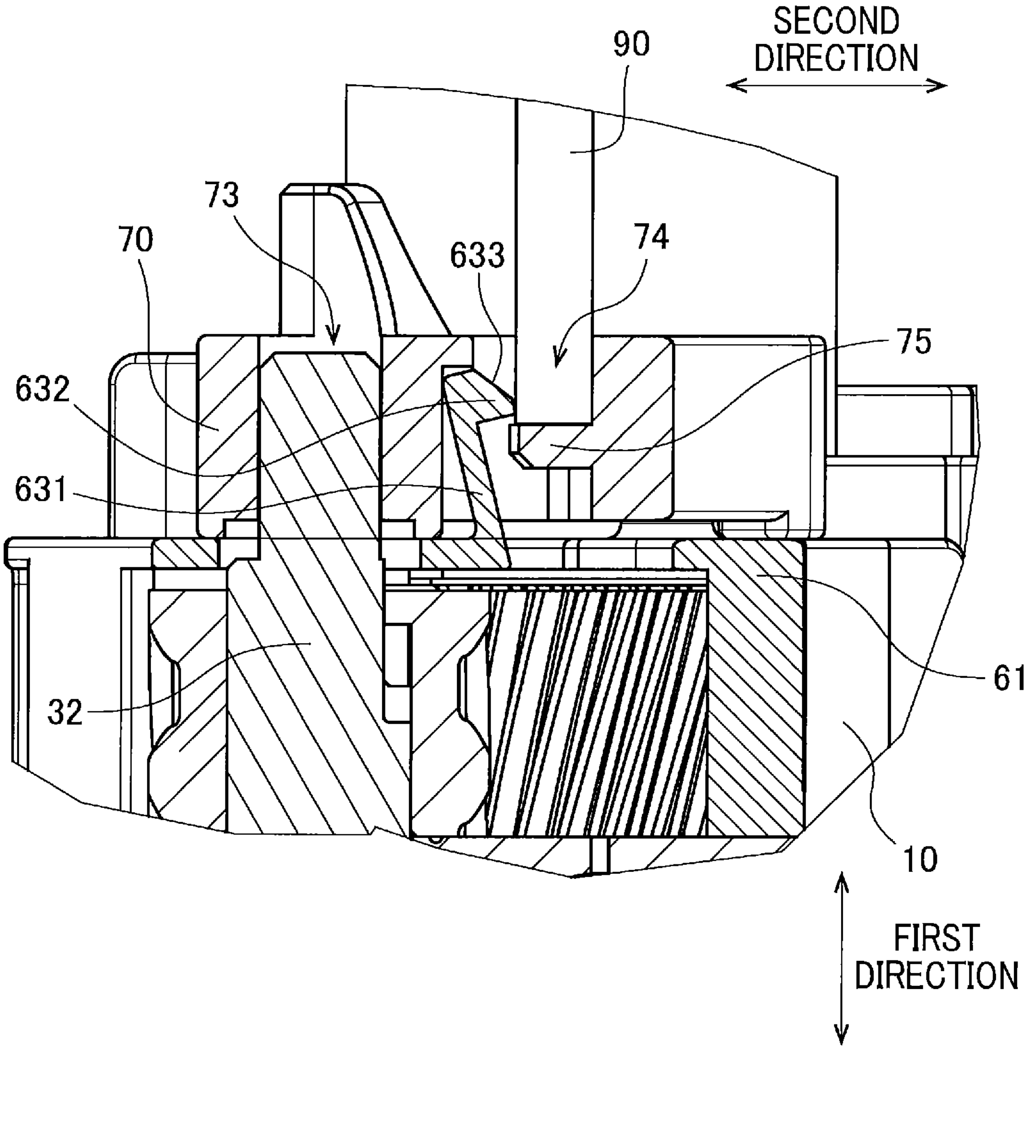
FIG. 10 is a cross-sectional view of the periphery of the second collar in a state where the jig is inserted.

For detaching the second collar 70 from the developing-roller shaft 32, the jig 90 is first inserted between the inner surface of the through-hole 74 and the second pawl 632. FIG. 10 is a cross-sectional view of the periphery of the second collar 70 in a state where the jig 90 is inserted. When the jig 90 is inserted between the inner surface of the through-hole 74 and the second pawl 632, the second arm 631 bends and the second pawl 632 thus moves from a third position (the position illustrated in FIG. 9) at which the second pawl 632 is in engagement with the second pawl-receiving portion 75 to a fourth position (the position illustrated in FIG. 10) at which the second pawl 632 is separated from the second pawl-receiving portion 75. Hence, the engagement of the second pawl 632 with the second pawl-receiving portion 75 is released.

Thereafter, the second collar 70 moves in a direction away from the casing 10 in the first direction with the second pawl 632 positioned at the fourth position. As a result, the second collar 70 is detached from the another end portion of the developing-roller shaft 32 in the first direction.

The second pawl 632 has a second tapered surface 633. The second tapered surface 633 faces the inner surface of the through-hole 74 of the second collar 70 in the second direction. The second tapered surface 633 is inclined relative to the first direction. More specifically, the second tapered surface 633 is closer to the inner surface of the through-hole 74 of the second collar 70 in the second direction as approaching the second pawl-receiving portion 75 in the first direction. With this structure, simply by inserting the jig 90 between the second tapered surface 633 and the inner surface of the through-hole 74 of the second collar 70 and further pushing the inserted jig 90 along the second tapered surface 633, the second arm 631 can be bent and the second pawl 632 can thus be moved from the third position to the fourth position, whereby the second pawl 632 can be easily disengaged from the second pawl-receiving portion 75.

The second arm 631 and the second pawl 632 are provided at the gear cover 61 made of not an electrically conductive resin but an electrically non-conductive resin. Electrically non-conductive resins have a higher flexibility than electrically conductive resins. Hence, by having the gear cover 61 provided with the second arm 631 and the second pawl 632, the second arm 631 can be bent well. Accordingly, the second arm 631 can be suppressed from being broken during detachment of the second collar 70 from the developing-roller shaft 32.

If the second pawl 632 moves to a position that is closer to the developing-roller shaft 32 than the fourth position is to the developing-roller shaft 32, the second arm 631 comes into contact with the inner surface of the through-hole 74 of the second collar 70. Thus, the second arm 631 can be suppressed from being excessively bent. That is, the inner surface of the through-hole 74 of the second collar 70 serves as a restriction surface for restricting bending of the second arm 631. Accordingly, the second arm 631 can be further suppressed from being broken.

<4. Variations>

The developing cartridge 1 may be attached to a drum cartridge including one photosensitive drum, or may be attached to a drum cartridge including a plurality of photosensitive drums. Moreover, the developing cartridge 1 may be attached directly to an image-forming apparatus.

The precise shape of the developing cartridge 1 may differ from the shape illustrated in the drawings of this specification. Further, components that appear in the embodiment and variations described above may be combined as appropriate as long as no contradictions occur.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A developing cartridge comprising:
- a housing configured to accommodate a developing agent;
- a developing roller including a developing-roller shaft extending in a first direction;
- an electrode positioned at one end portion of the housing in the first direction, the electrode being electrically connected to the developing-roller shaft, the electrode being made of an electrically conductive resin; and
- a first collar covering one end portion of the developing-roller shaft in the first direction, the first collar being made of an electrically non-conductive resin,
- wherein the first collar comprises:
  - a first arm extending in the first direction;
  - a first pawl configured to engage with the electrode, the first pawl protruding from the first arm in a direction away from the developing-roller shaft, and
- wherein the first pawl is movable between:
  - a first position at which the first pawl is in engagement with the electrode; and
  - a second position at which the first pawl is separated from the electrode.

2. The developing cartridge according to claim 1, wherein the developing-roller shaft is made of metal.

3. The developing cartridge according to claim 1, wherein, in a radial direction of the developing roller, the first pawl protrudes in a direction away from the developing-roller shaft.

4. The developing cartridge according to claim 1, wherein the first pawl is inserted between the housing and the electrode in the first direction.

5. The developing cartridge according to claim 1, wherein the developing roller is positioned at one end portion of the housing in a second direction crossing the first direction, and wherein, in the second direction, the first pawl protrudes in a direction away from the one end portion in the second direction of the housing.

6. The developing cartridge according to claim 5, wherein the first collar comprises:

an end wall portion covering an end surface of the one end portion of the developing-roller shaft; and a circumferential wall portion covering an outer circumferential surface of the one end portion of the developing-roller shaft, the circumferential wall portion having a notch, and wherein the first arm and the first pawl are positioned on an opposite side of the notch from the developing-roller shaft in the second direction.

7. The developing cartridge according to claim 6, wherein the first arm extends from an edge of the end wall portion toward the housing in the first direction.

8. The developing cartridge according to claim 5, wherein the electrode has:

a first tapered surface facing the first arm in the second direction, the first tapered surface being closer to the first arm in the second direction as approaching the first pawl in the first direction.

9. The developing cartridge according to claim 5, further comprising:

a second collar covering another end portion of the developing-roller shaft in the first direction, the second collar being made of an electrically non-conductive resin; and a gear cover positioned at another end portion of the housing in the first direction, the gear cover being positioned between the housing and the second collar, wherein the gear cover comprises:

a second arm extending in the first direction; and a second pawl protruding from the second arm in a direction away from the developing-roller shaft, and wherein the second collar comprises:

a pawl-receiving portion inserted between the housing and the second pawl.

10. The developing cartridge according to claim 9, wherein, in the second direction, the second pawl protrudes in a direction away from the one end portion in the second direction of the housing.

11. The developing cartridge according to claim 9, wherein, in the first direction, the second arm extends in a direction away from the housing.

12. The developing cartridge according to claim 9, wherein the second collar has:

a through-hole penetrating the second collar in the first direction, wherein the pawl-receiving portion is positioned in the through-hole, and wherein the second arm and the second pawl are inserted in the through-hole.

13. The developing cartridge according to claim 12, wherein the second pawl has:

a second tapered surface facing an inner surface of the through-hole of the second collar in the second direction, the second tapered surface being closer to the inner surface in the second direction as approaching the pawl-receiving portion in the first direction.

* * * * *